June 5, 1951  J. WOLFSON  2,556,131
DRILL VISE AND JIG
Filed Sept. 22, 1948
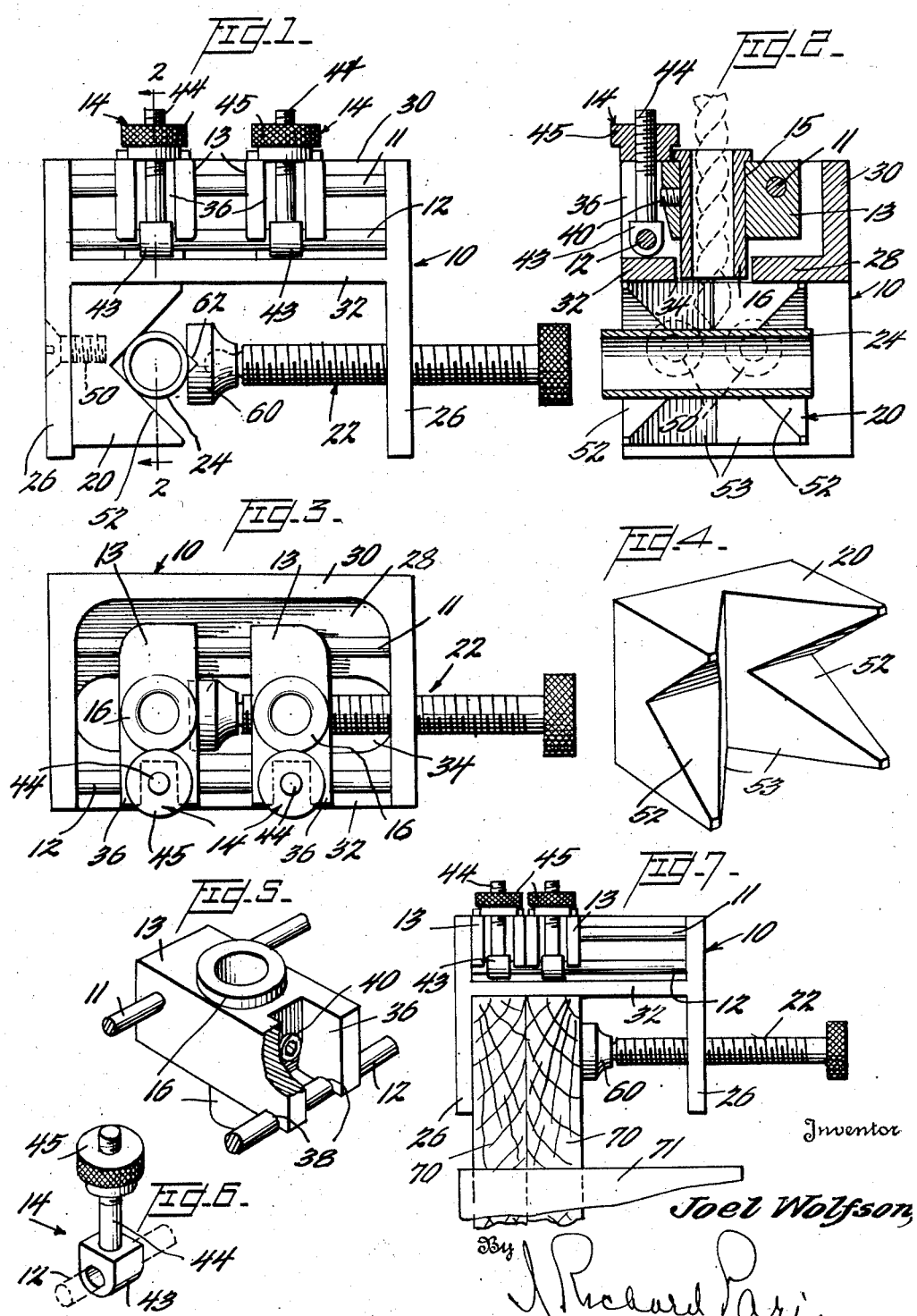
Inventor
Joel Wolfson,
By J. Richard Paris
ATTORNEY

Patented June 5, 1951

2,556,131

UNITED STATES PATENT OFFICE 2,556,131

DRILL VISE AND JIG

Joel Wolfson, Bayonne, N. J.

Application September 22, 1948, Serial No. 50,610

4 Claims. (Cl. 77—62)

The present invention relates to an improved drill jig and has for its object to provide a simple rugged unitary drill jig which is adaptable for drilling and boring a large variety of work-pieces.

Another object of the present invention is to provide an improved universal drill vise in which the drill guides may be readily adjusted with precision to the desired position with reference to the work. Another object of the present invention is to provide a device of this type which may be employed under a variety of operative conditions, such as by placing the same on the drill table or the like, or by placing the same or the work-piece which it grips in a vise, or the like. A still further object of the present invention is to provide a universal drill jig which may operate upon round stock or upon rectangular stock, and which may operate upon such stock either transversely or endwise.

Other objects and advantages of the present invention will be apparent from the following detailed description taken together with the accompanying drawing.

In the drawing Fig. 1 is a front elevation of the apparatus embodying the present invention, the same being shown in position to drill a hole transversely of round metal stock. Fig. 2 is a sectional view thereof taken in line 2—2 in Fig. 1. Fig. 3 is a top view. Fig. 4 is a perspective view of the double V block employed in the present invention. Fig. 5 is a perspective view of the slideable guide showing one of its corners partly broken away. Fig. 6 is a perspective view of the clamping element. Fig. 7 shows the use of the present drill vise set to operate upon a pair of rectangular blocks, the latter being gripped by a vise.

In its broader aspects, the present drill jig comprises a main body or frame 10 provided with a pair of guide rods 11, 12 carrying a pair of slides 13 which may be positioned any place along the guides 11 and 12 and may be clamped in such position by clamps 14. Each of the slides 13 is provided with a vertical bore 15 which receives a shouldered bushing 16. A number of such bushings are available, each having substantially the same external diameter, and fitting snugly within the openings 15 and readily removeable therefrom; these bushings having different internal bores and are available for selection with any particular drilling operation to correspond with the size of drill hole desired. In the lower level of this device a double V-shaped block 20 is mounted against one side of the frame, the opposing or cooperating side of the frame carrying a clamping element 22, for firmly gripping in a vise-like manner the work-piece such as the work-piece 24.

When it is desired to work upon rectangular stock, the double V block 20 is removed and the stock is gripped in the manner shown in Fig. 7.

In use the work-piece is first gripped whether in the manner shown in Fig. 1 or in Fig. 7, one or both of the slides 13 are released and then moved to the desired position over the work and clamped in position. The proper bushing 16 is inserted and the drilling may then be accomplished under any suitable conditions. Thus the device, together with the work held therein may be placed on a drill table or the work which may extend downwardly from the support may be gripped by a vise.

Referring now more particularly to some of the detailed features of the present apparatus, the frame or body 10 may be of any suitable construction. In the preferred form, it is shown as a single casting having a pair of parallel end walls 26, the same being connected by an intermediate horizontal wall 28, which divides each end wall 26 into an upper frame portion and a lower leg portion. The body 10 may also be provided with a back plate 30, which is integral with the horizontal wall portion 28. The bar 32 which connects the end walls 26 preferably is in the same plane with the horizontal wall 28 and is spaced from its front edge, thereby providing the elongated opening 34 extending from one end plate to the other.

Thus in its essential respects the body 10 of the present apparatus comprises a pair of end plates connected by a short integral back plate and a split integral horizontal plate. The split integral horizontal plate consists of the two portions 28 and 32, which are spaced from each other and provide for the passage of the drill bit therethrough.

This horizontal wall comprising the two parts 28 and 32 divides the device into an upper chamber and a lower chamber. The upper chamber is utilized for housing the slides and bushings and the support and clamping means therefor, while the lower chamber is utilized for the work-piece and the means and devices for clamping the work-piece therein.

Guide rod 11 is mounted on the end plates in approximately the upper rear corner of the body as is well shown in Figs. 2 and 3. The guide rod 12 is similarly mounted between the end plates 26 in the lower forward corner of the upper chamber.

The slides 13 are metal blocks carried by the guide rod 11. These slides may therefore be moved along the guide rod 11 and if desired may also be tilted or pivoted on the guide rod 11. At their forward ends the slides 13 are bifurcated, this bifurcated portion 36 being disposed over the second guide rod 12 and these portions being notched as shown at 38, so that the slide may be supported by the guide rod 12 in its properly adjusted position. This assembly of the slide block and guide rods 11 and 12 is made with a high degree of precision so that when the block is in its horizontal position, the bores 15 together with the removable bushings 16 provide a plumb vertical passage for the drill bit. A slide 13 may also be provided with a set screw 40 for clamping the bushing 16 in position when the apparatus is in use.

The guide rod 12, which, as has already been described, serves to support the slides 13 in their operative positions additionally serves to carry and guide clamping units 14. These units comprise an apertured block portion 43, which slides on rod 12 and also comprises a rod portion 44 threaded at its upper end and receiving the shouldered nut 45. In clamping position, the clamping unit is disposed within the bifurcated end of the slide and the nut 45 is threaded down into clamping position so as to press the bifurcated end of the slide 13 against the rod 12, and firmly retain the same in this clamped position. In this position the enlarged portion of the nut 45 overlies the shoulder of the bushing 16, thus retaining the same in its operative position. When it is desired to shift the position of the slide 13, the nut 45 is unthreaded and the clamp and slide may be moved together as a unit, or the clamp may be released and thrown forward about the rod 12 as a pivot and the slide 13 may be moved upward about the rod 11 as a pivot and then along rod 11 to the desired position. When the position is approximately reached, the two elements are brought into loose inter-engagement and then moved to the exact position desired and clamped.

The block 20 is disposed in the lower chamber of the present apparatus and is mounted against a leg 26 by screws 50 and may thus be readily removed when desired. The block 20 is an accurately machined unit, and provided on its operative face with a pair of V-shaped grooves 52 and 53 disposed at right angles to each other. The opposing leg 26 carries the threaded bolt 22 provided with a loosely mounted clamping head 60, the latter being grooved on its face as shown in 62. The rod 22 is preferably centered along the intersection of the grooves 52 and 53.

When it is desired to employ the present apparatus in drilling transverse drill holes in round stock, the stock is positioned and gripped as shown in Figs. 1 and 2. The proper size bushing having been selected and mounted, the slide 13 is properly placed and clamped, and this assembled apparatus may then be placed upon a drill table and the drilling performed by a suitable boring or drill device. When it is desired to perform a drilling or boring operation endwise of round stock, the stock is clamped in the vertical V-53 of the double V block 20. If the work-piece protrudes downwardly from the apparatus, the work-piece may be gripped on a vise or the entire assembly may be placed upon a drill table which may be provided with suitable passages and openings to permit the work to project through the table.

When it is desired to perform drilling or boring operations upon rectangular work-pieces, the block 20 may be removed and the work-pieces may be clamped as shown in Fig. 7. In the form shown here the work-pieces 70 are clamped by a vise 71.

Fig. 7 also illustrates how the present apparatus is utilized for accurately drilling a pair of parallel and accurately spaced bore holes in one or two work-pieces. As shown, both slides 13 are clamped in position over the work-pieces 70, and the drillings or borings which will be had as a result of the arrangement will provide accurate and parallel spacing between the two bore holes.

While I have illustrated and described a preferred and specific embodiment of my invention, it will be understood that modifications falling within the scope of the present invention as defined in the appended claims may be apparent to persons skilled in the art.

I claim:

1. A drill device comprising a main body having a pair of end walls and a horizontal wall integral with said end walls and dividing the body into an upper jig supporting chamber and a lower work supporting chamber, said horizontal wall having a wide slot in its median portion extending from one end wall to the other; a pair of guide rods mounted on said end walls and disposed in said upper chamber; a slide block slidably and pivotally carried by one of said rods, the lower face of its forward end being notched in registry with the other rod and freely resting thereon, whereby the block may be pivoted on said rod and moved longitudinally thereon, the block having a passage receiving removable sleeves; clamping means for said block slidably carried by said other guide rod and cooperating with said forward end of said block to clamp the same in a selected position; and clamping means mounted in said lower chamber for clamping work-pieces therein.

2. A drill device comprising a main body having a pair of end walls and a horizontal wall integral with said end walls and dividing the body into an upper jig supporting chamber and a lower work supporting chamber; a pair of guide rods mounted on said end walls and disposed in said upper chamber; a slide block slidably and pivotally carried by one of said rods and having its forward end resting freely on said other rod whereby the block may be pivoted in a vertical plane and moved along said first rod, the block having an opening receiving a removable sleeve; a clamping device for said block slidably and pivotally carried by said other guide rod and cooperating with said forward end of said block to clamp said block in a selected position; and means mounted in said lower chamber for clamping work-pieces therein.

3. A drill device comprising a main body having a pair of end walls and a horizontal wall integral with said end walls and dividing the body into an upper jig supporting chamber and a lower work supporting chamber; a pair of guide rods mounted on said end walls and disposed in said upper chamber; a slide block slidably and pivotally carried by one of said rods and having its forward end supported by the other rod, said block having a vertical aperture receiving a removable jig sleeve; clamping means for said block slidably carried by said other guide rod and cooperating with said forward end of said block to clamp the same in a selected position;

and means mounted in said lower chamber for clamping work-pieces therein.

4. In a drill jig, the combination of a body having a pair of parallel end walls and a horizontal wall integral with said end walls and dividing the body into an upper jig supporting chamber and a lower work supporting chamber; a pair of guide rods mounted on said end walls and disposed in said upper chamber; a slide block slidably carried by one of said rods and having its forward end supported by the other rod, the block having a vertical passage and a removable shouldered bushing disposed therein; and clamping means for said block slidably carried by said other guide rod, the clamping means, when in clamping position, having a portion overlying the shoulder of said bushing.

JOEL WOLFSON.

REFERENCES CITED

The following references are of record in the file of this patent:

UNITED STATES PATENTS

| Number | Name | Date |
|---|---|---|
| 310,710 | Nichols | Jan. 13, 1885 |
| 581,811 | Coyle | May 4, 1897 |
| 706,392 | Corliss | Aug. 5, 1902 |
| 809,069 | Lovett | Jan. 2, 1906 |
| 917,488 | Roberts | Apr. 6, 1909 |
| 971,627 | Nicholls | Oct. 4, 1910 |
| 1,161,479 | Kelley | Nov. 23, 1915 |
| 1,210,942 | Jones | Jan. 2, 1917 |
| 1,269,811 | Heritage | June 18, 1918 |
| 1,861,289 | Abramson | May 31, 1932 |

OTHER REFERENCES

American Machinist, page 1108, June 29, 1916.